(12) United States Patent
Horist

(10) Patent No.: US 9,699,867 B2
(45) Date of Patent: Jul. 4, 2017

(54) SOUND RESPONSIVE LIGHTING SYSTEM

(71) Applicant: Steven Horist, Orange, CA (US)

(72) Inventor: Steven Horist, Orange, CA (US)

( * ) Notice: Subject to any disclaimer, the term of this patent is extended or adjusted under 35 U.S.C. 154(b) by 0 days.

(21) Appl. No.: 15/267,101

(22) Filed: Sep. 15, 2016

(65) Prior Publication Data
US 2017/0079119 A1 Mar. 16, 2017

Related U.S. Application Data

(60) Provisional application No. 62/218,704, filed on Sep. 15, 2015.

(51) Int. Cl.
H05B 37/02 (2006.01)
H05B 33/08 (2006.01)
G10H 1/00 (2006.01)

(52) U.S. Cl.
CPC ....... H05B 37/0236 (2013.01); G10H 1/0066 (2013.01); H05B 33/0854 (2013.01); H05B 33/0872 (2013.01); G10H 2210/066 (2013.01)

(58) Field of Classification Search
CPC ..................... A63J 17/00; G10L 15/28; G10L 2021/02082; G10L 21/0208
See application file for complete search history.

(56) References Cited

U.S. PATENT DOCUMENTS 7,459,623 B2 * 12/2008 Robertson ............... A63J 17/00
340/815.46
9,558,758 B1 * 1/2017 Piersol ................ G10L 21/0208

* cited by examiner

Primary Examiner — Monica C King
(74) Attorney, Agent, or Firm — Robert J. Lauson; Lauson & Tarver LLP

(57) ABSTRACT

A lighting system adjustable in response to a musical sound input is provided, where the color properties of the lights and the intensity of the lights are varied according to the variation of the sound frequency and the volume. The sound frequency signal is correlated within a controller to a first light property setting; and the sound amplitude signal is correlated to a second light property setting. As the sound frequency signal is varied between a lower and upper range, the first light property setting is similarly adjusted between a lower and upper range. As the sound amplitude signal is varied within a range, the second light property setting is similarly adjusted by the controller between a lower and upper range. In this way, the controller adjusts the color and intensity of the light to correspond to the volume and musical note of a musical input, generally from an instrument.

20 Claims, 18 Drawing Sheets

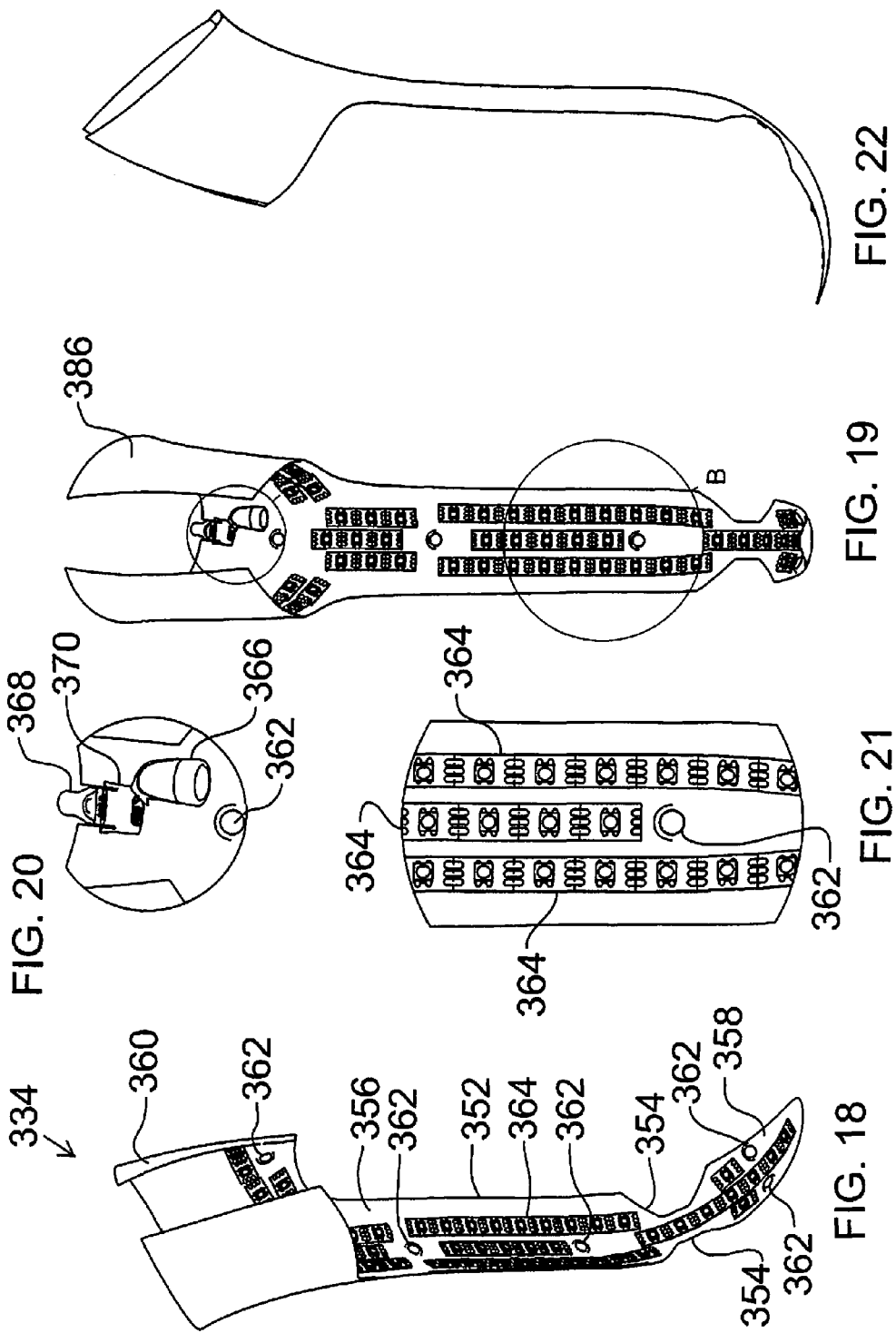

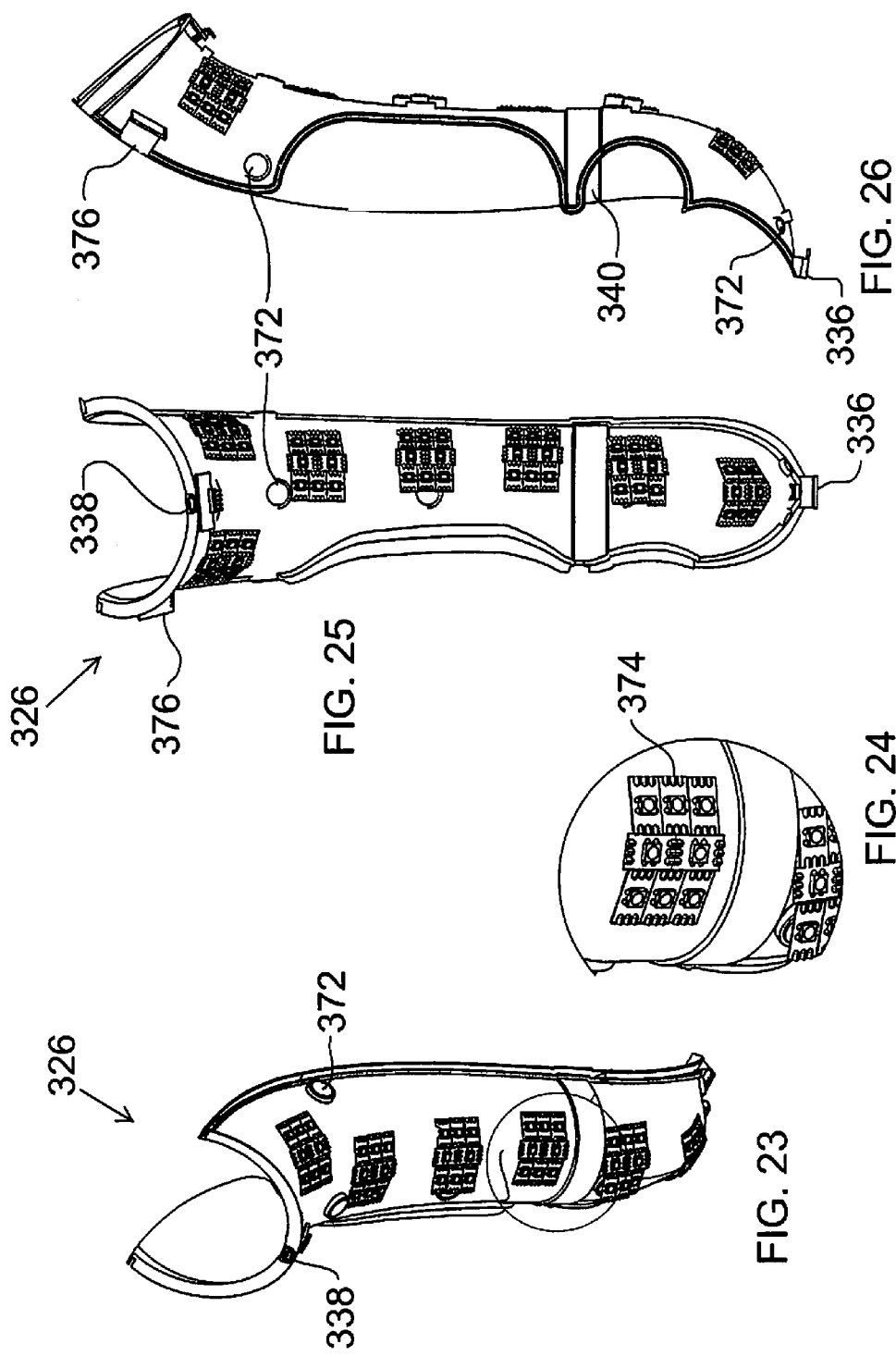

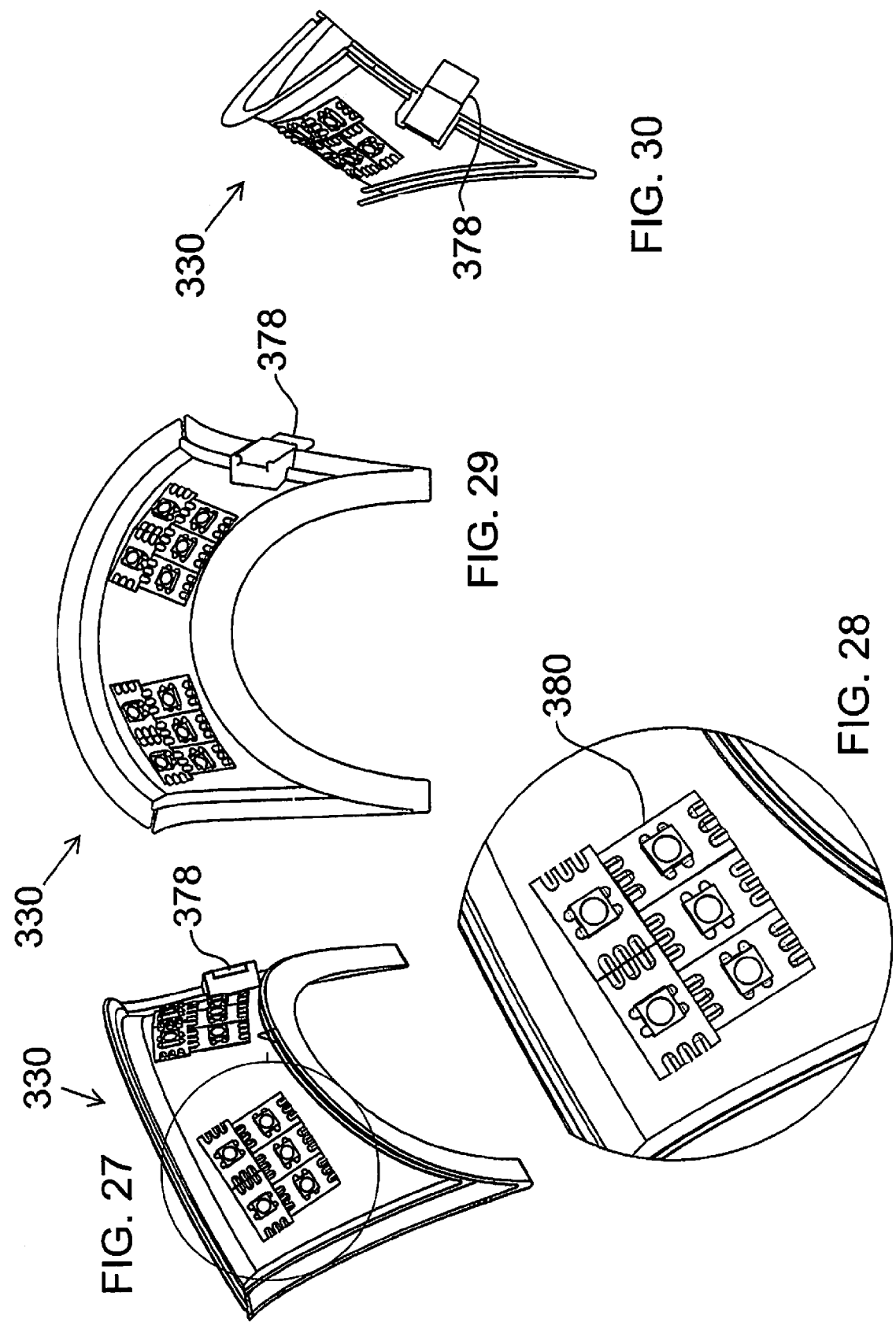

Step 1
Choose "Lower Range Color"

Example: RED (Color Value 255, 0, 0)

Step 2
Choose "Middle Range Color"

Example: Green (Color Value 0, 255, 0)

Step 3
Choose "Higher Range Color"

Example: Blue (Color Value 0, 0, 255)

FIG. 32A

Step 4
Play lowest note of pitch range 3 times

Example: 1st time average of 103.45 Hz | 2nd time average of 104.21 Hz | 3rd time average of 102.1 Hz Calculation: Lowest of 3 pitches played = 103.26 Hz

FIG. 32B

SOUND RESPONSIVE LIGHTING SYSTEM

BACKGROUND

Light shows have long been a part of concerts and other musical events. Lights can be used to affect the mood of the audience and complement the music being played. What is needed is a means to more closely associate the lights with the music and instrument.

SUMMARY

A lighting system that is adjustable in response to a sound is provided; the light system generally includes a color adjustable light source and a controller. The controller includes a processor core, a memory, a sound signal input, and a light signal output, where the sound signal input is receptive to a sound frequency signal and a sound amplitude signal. The sound frequency signal is correlated within the controller to a first light property setting; and the sound amplitude signal is correlated within the controller to a second light property setting, with the light signal output in communication with the color adjustable light source. The sound frequency signal and the sound amplitude signal is determined by measurement of the sound sensed, the first light property setting adjusted in response to change in the sound frequency signal, the second light property setting adjusted in response to change in the sound amplitude signal. Further, the first light property setting and the second light property setting is communicated to the color adjustable light source to adjust a color value and an intensity value of the color adjustable light source.

As an option, the first light property setting is the color value and the second light property setting is the intensity value. Alternatively, the first light property setting is the intensity value and the second light property setting is the color value. The color adjustable light source may be a light emitting diode (LED). The color adjustable light source may be a first light source and a second light source arranged on a base.

As yet another option, a light divider may be positioned overtop the base, where the light divider has a plurality of slats arranged to define a first defined light region and a second defined light region, with the first light source aligned to emit light through the first defined light region and the second light source aligned to emit light through the second defined light region. Further optionally, a first color value and a first intensity value are communicated to the first light source and a second color value and a second intensity value are communicated to the second light source. The light emitted by the first light source may be substantially restricted to the first defined light region and light emitted by the second light source may be substantially restricted to the second defined light region. Optionally, the color adjustable light source is integrated with an enclosure which includes the controller or is a light unit separate from the controller.

As an option, the enclosure may include a translucent region or a transparent region through which light emitted from the color adjustable light source is transmitted out of the enclosure. The light unit may be attached to an instrument. The light unit may be shaped to conform to a portion of the instrument. One or both of the light unit and the controller may include a microphone to sense sound emitted from the instrument.

BRIEF DESCRIPTION OF THE SEVERAL VIEWS OF THE DRAWINGS

FIG. 18 is a perspective view of an example saxophone bell inner liner;

FIG. 19 is a front view of the bell inner liner of FIG. 18;

FIG. 20 is a magnified partial top view of the top portion of the bell inner liner of FIG. 19, showing the plug and the microphone;

FIG. 21 is a magnified partial top view of the mid portion of the bell inner liner of FIG. 19, showing the LED strips;

FIG. 22 is a side view of the bell inner liner of FIG. 18;

FIG. 23 is a perspective view of an exemplary front outer shell, showing the LEDs mounted therein;

FIG. 24 is a magnified partial perspective view of the front outer shell of FIG. 23;

FIG. 25 is a front view of the front outer shell of FIG. 23;

FIG. 26 is a side view of the front outer shell of FIG. 23;

FIG. 27 is a perspective view of an exemplary back outer shell, showing the LEDs mounted therein;

FIG. 28 is a magnified partial perspective view of the back outer shell of FIG. 27;

FIG. 29 is a front view of the back outer shell of FIG. 27;

FIG. 30 is a side view of the back outer shell of FIG. 27;

FIGS. 32A-C are process flowcharts of one method of the present invention, illustrating an alternate example method of the instrument setup;

Figure 1:
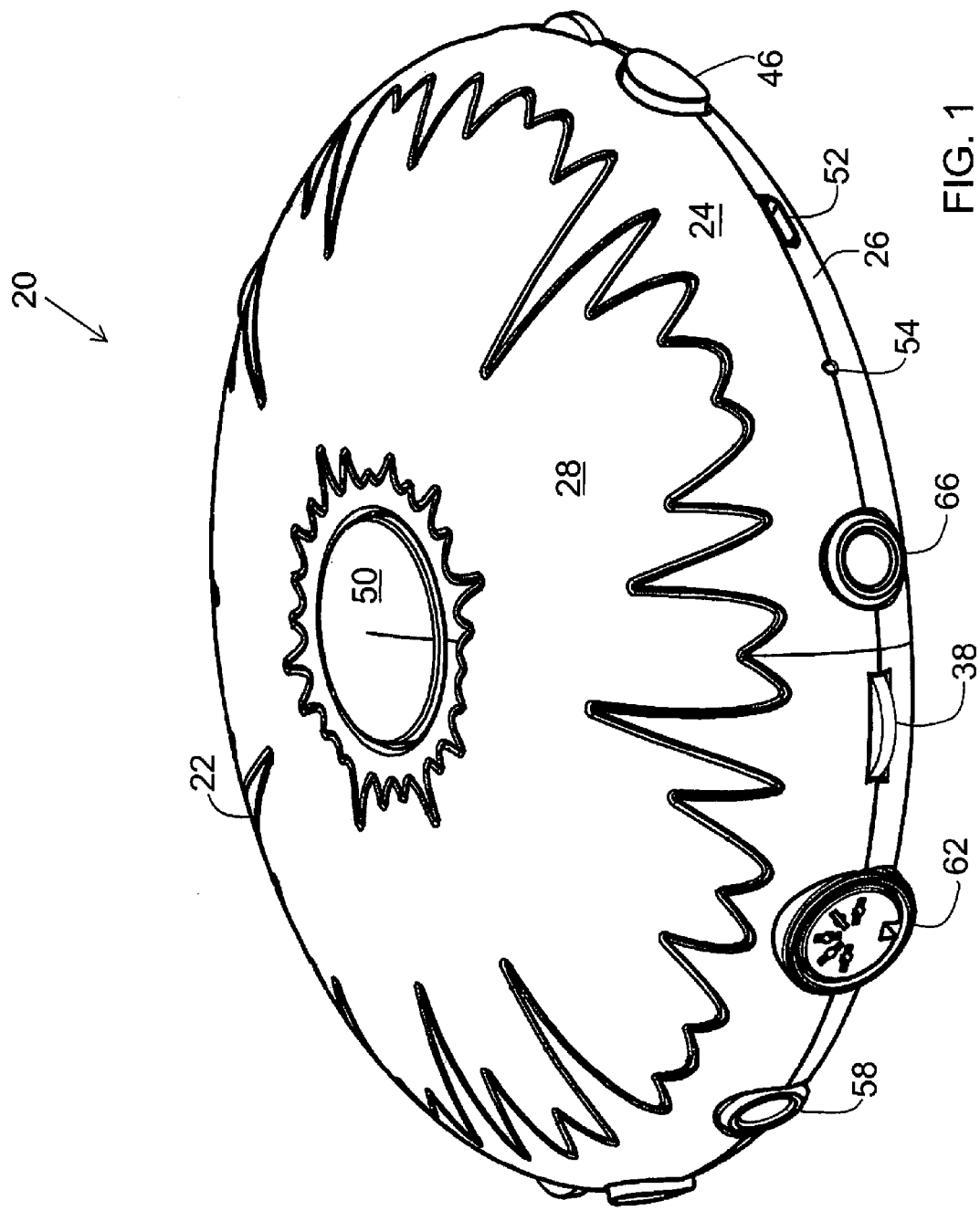
FIG. 1 is a top perspective view of an example embodiment of the present controller for use as part of a sound responsive lighting system.
Figure 2:
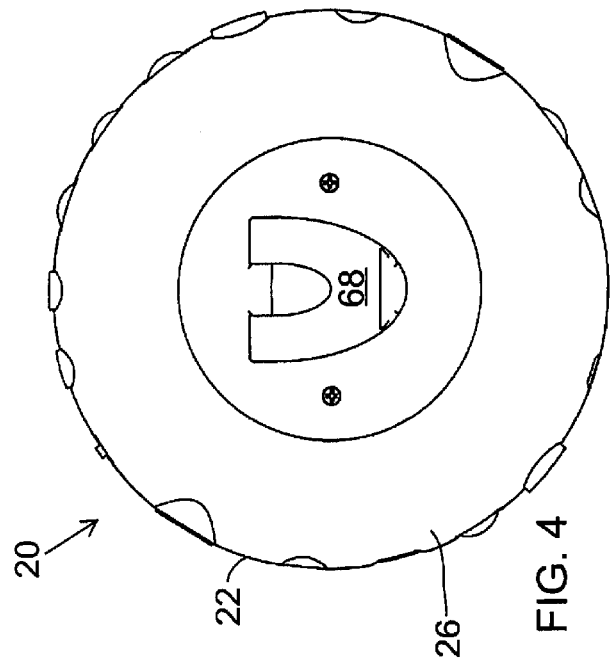
FIG. 2 is a top view of the controller of FIG. 1.
Figure 3:
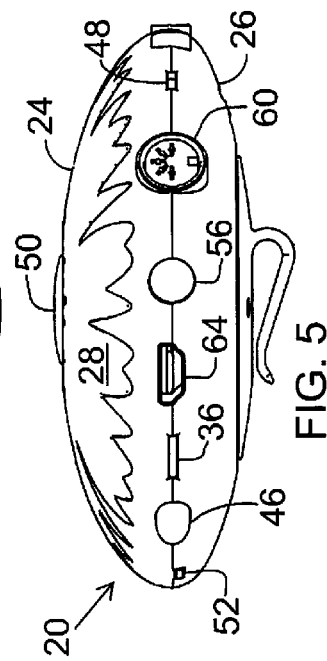
FIG. 3 is a first side view of the controller of FIG. 1.
Figure 4:
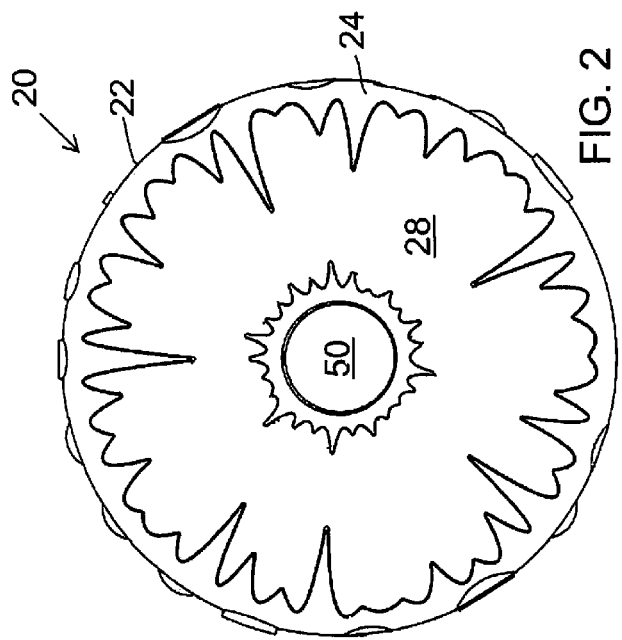
FIG. 4 is a bottom view of the controller of FIG. 1.
Figure 5:
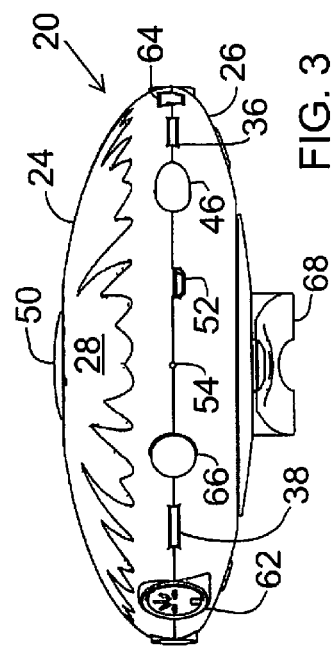
FIG. 5 is a second side view of the controller of FIG. 1.

LISTING OF REFERENCE NUMERALS OF FIRST-PREFERRED EMBODIMENT controller 20
enclosure 22
top shell 24
bottom shell 26
translucent portion 28
red RGB thumbwheel 30
green RGB thumbwheel 32
blue RGB thumbwheel 34
intensity thumbwheel 36
audio adjustment thumbwheel 38
edit mode button 40
profile button 42
test mode button 44
dark mode button 46
slide switch 48
power in connector 52
reset button 54
line in connector 56
line out connector 58
MIDI in connector 60
MIDI through connector 62
HDMI connector 64
expression pedal connector 66
clip 68
LED divider 70
circumferential slat 72
radial slat 74
defined light region 76
tri-color (RGB) LED 78
circuit board 80
LED array 82
attachment slots 84
illuminated shell 320
front shell 322
back shell 324
front inner half 326
front outer half 328
back inner half 330
back outer half 332
bell inner liner 334
first data connector 336
second data connector 338
collar groove 340
key cutout 342, 344
gripping arm 346, 348
bow gripping portion 350
flexible sheet 352
notch 354
bell portion 356
bow portion 358
flared portion 360
magnet 362
LED light strip 364
microphone 366
wire guide sleeve 368
third data connector 370
magnet 372
LED array 374
fourth data connector (female) 376
fourth data connector (male) 378
LED array 380
flared portion 382
bell opening 384
flared portion 386

DESCRIPTION OF THE PREFERRED EMBODIMENTS

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

FIGS. 1-5 illustrate an example embodiment of the present controller (20). Although the housing (22) for the controller (20) is shown herein as being an approximate oblate spheroid, with the various connectors and controllers about the perimeter, the design may be more simplistic, for example, a standard box enclosure. The housing or enclosure (22) includes a top shell (24) and a bottom shell (26), creating an electronics enclosure for housing the controller circuits, manual controls, and plugs. In one example embodiment, the controller includes integral LED chips mounted where space permits or in a pattern or array, such as in an LED module or engine (lighting engine). Included in this embodiment is a translucent or transparent portion (28) on the housing (22), so that light emitted from the internal LEDs transmits through the translucent portion (28) for external viewing. A translucent material is preferred for the translucent portion (28), so that the light emitted from the LEDs may be diffused. A power button (50) is centrally located through the top shell (24). Various openings about the perimeter of the controller (20) allow user access to various jack, plugs, connectors, dials and switches. A clip (68) is located on the bottom shell (26) for convenient attachment to a belt or other object. Other attachments may include a flat surface mount, an action camera mount, or other mount for attaching the controller to various objects, such as a mic stand or other nearby object or support.

Further illustrated are the various manual controls, connectors, plugs, and the like that are provided in this example embodiment of the controller (20). Several thumbwheels are included for manually adjusting the light properties settings of the dimmable and color adjustable light sources (such as a tri-color or RGB LED). The color value of the light may be adjusted by turning one or more of the red RGB thumbwheel (30), the green RGB thumbwheel (32), and the blue RGB thumbwheel (34). The intensity or brightness of the light may be adjusted by turning the intensity thumbwheel (36). Further, audio levels may be set by turning the audio adjustment thumbwheel (38). Various modes and other settings may be entered by activating switches and buttons, such as the edit mode button (40), the profile button (42), the test mode button (44), the dark mode button (46), and the slide switch (48). Additionally, various audio, data, electricity, and other inputs and outputs are transmitted to and from the controller through various plugs and connectors, such as the power in connector (52), the line in connector (56), the line out connector (58), the MIDI in connector (60), the MIDI through connector (62), the HDMI connector (64), and the expression pedal connector (66). To reset certain or all properties stored in the controller (20) a recessed reset button (54) is also provided. Although numerous manual controls and wired connections are shown, it is appreciated that current and similar future technologies permit the use of wireless power and communications transmission and remote adjustment of the controller (20) settings. For example, all of the LED light settings may be adjusted with an application installed on a computing device, using a graphical user interface with various controls, such as sliders, buttons, and the like.

Figure 6:
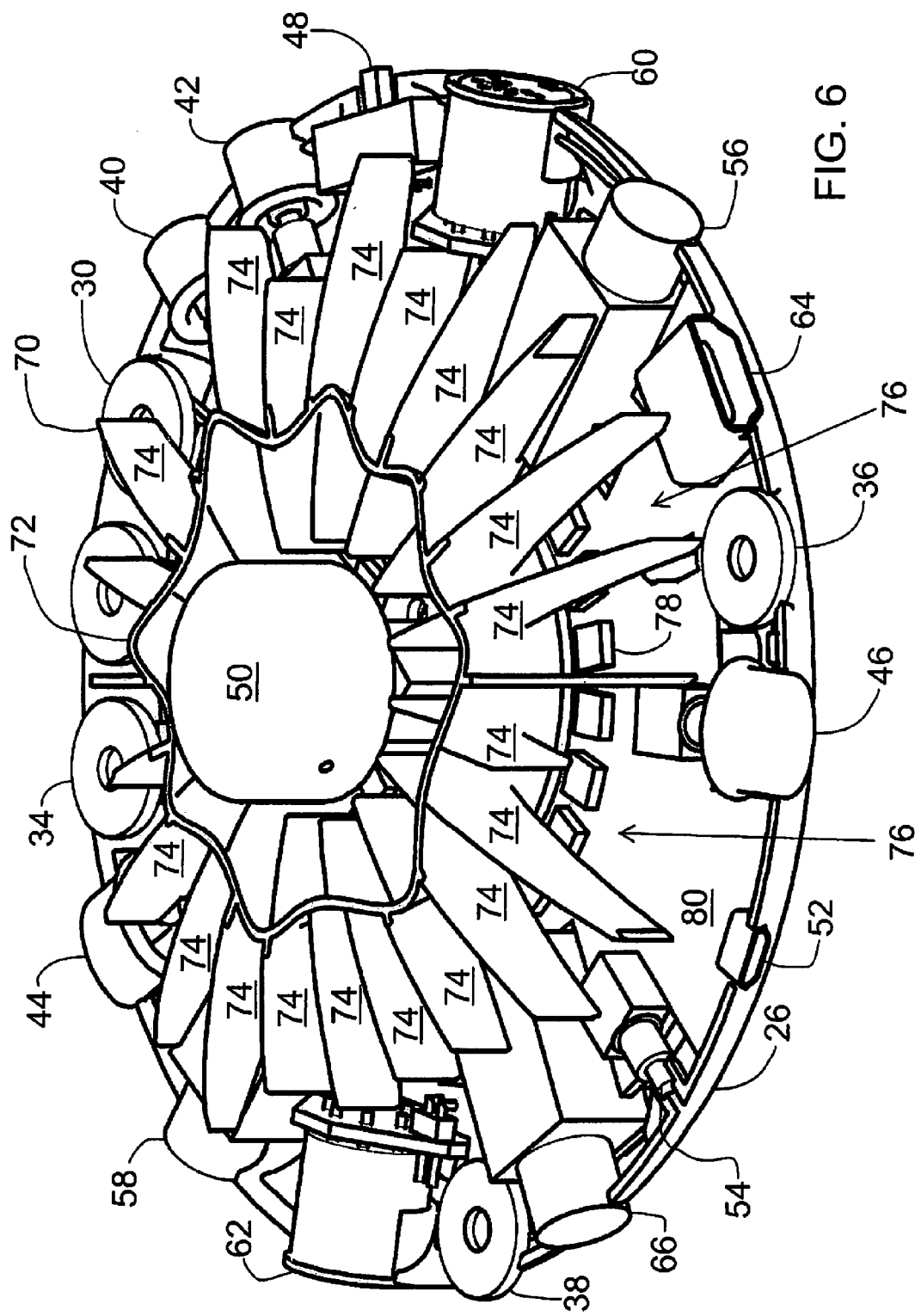
FIG. 6 is a top perspective of the controller of FIG. 1, with the top shell removed to show the internal circuitry and the light divider.
Figure 7:
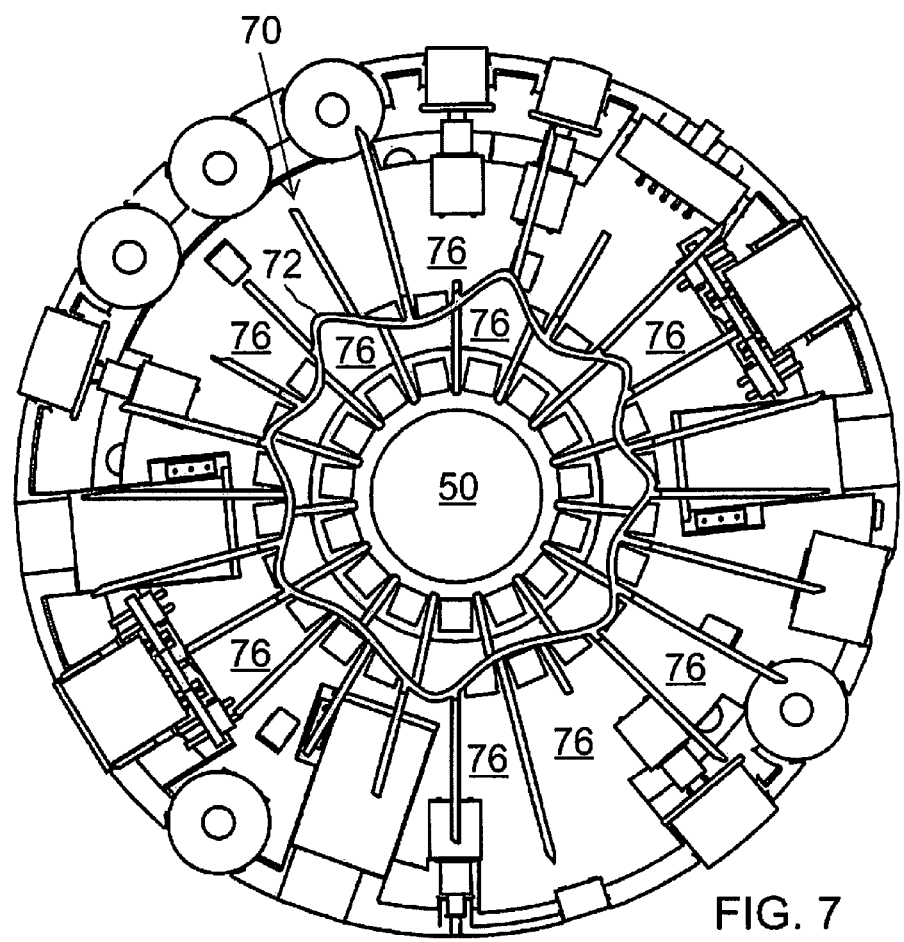
FIG. 7 is a top view of the partially disassembled controller of FIG. 6.
Figure 8:
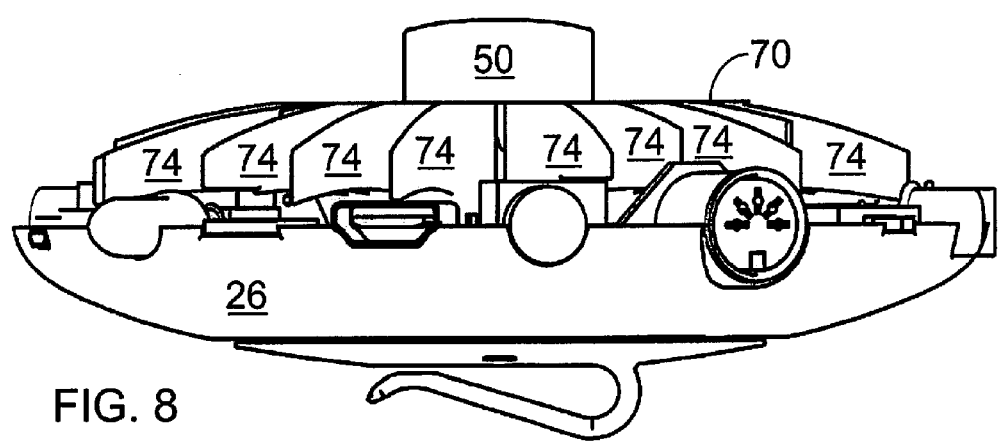
FIG. 8 is a second side view of the partially disassembled controller of FIG. 6.
Figure 9:
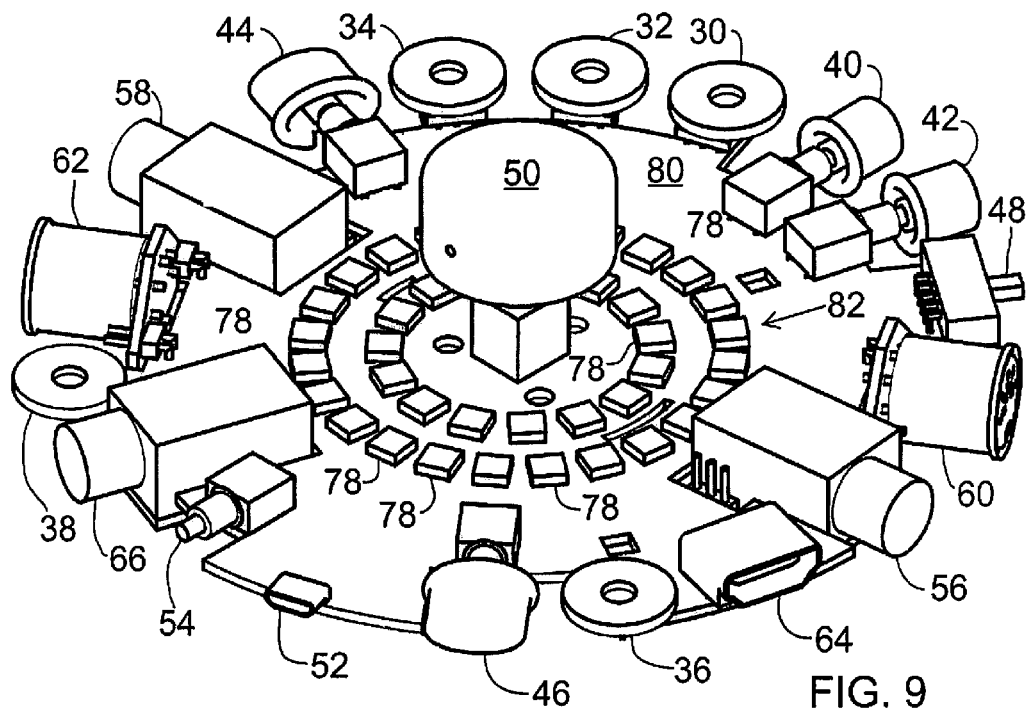
FIG. 9 is a top perspective view of the controller circuit board showing the components mounted thereon.
Figure 10:
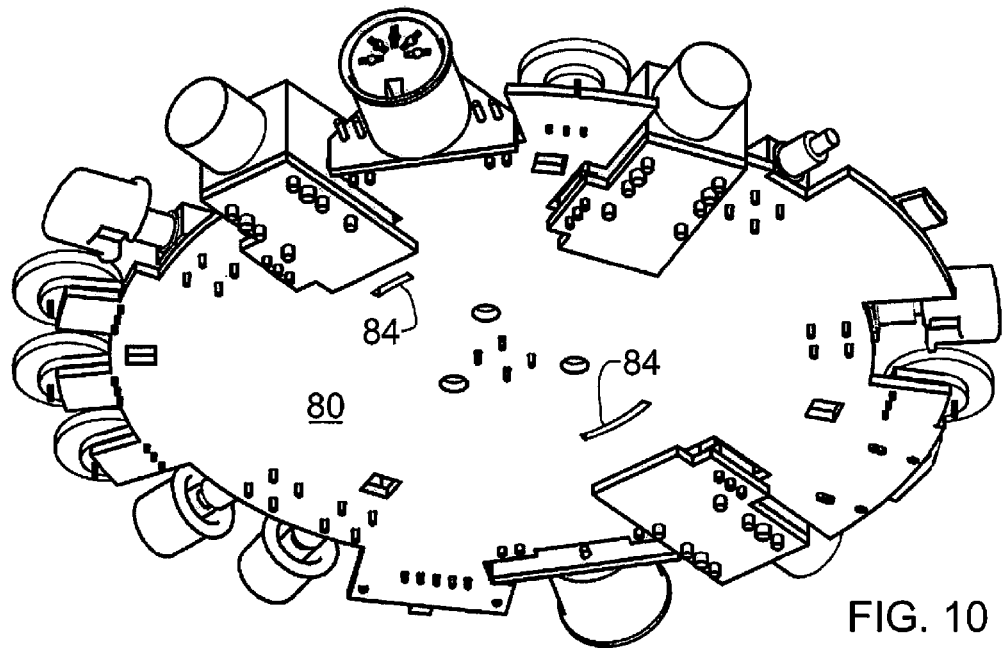
FIG. 10 is a bottom perspective view of the controller circuit board showing the components mounted thereon.
Figure 11:
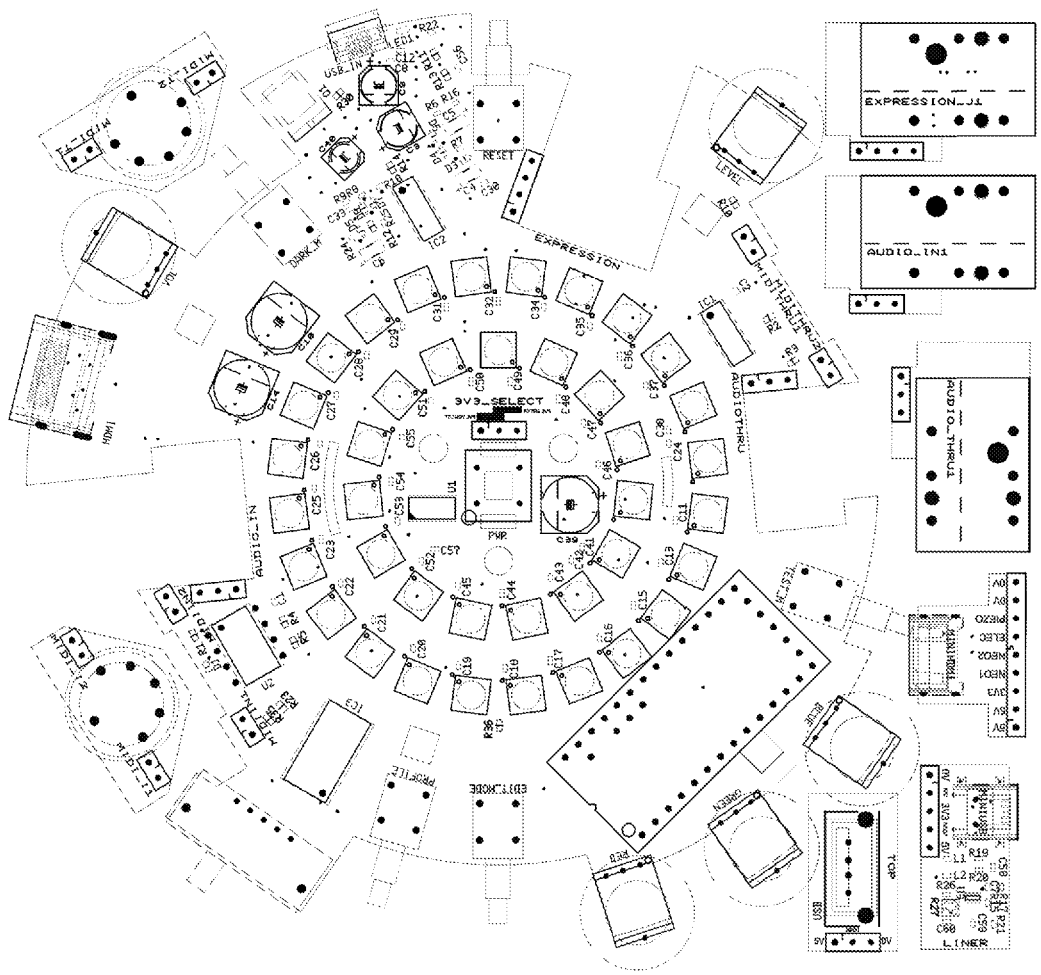
FIG. 11 is exemplary diagram illustrating the mounting arrangement of the various electronic components within the controller.
Figure 12:
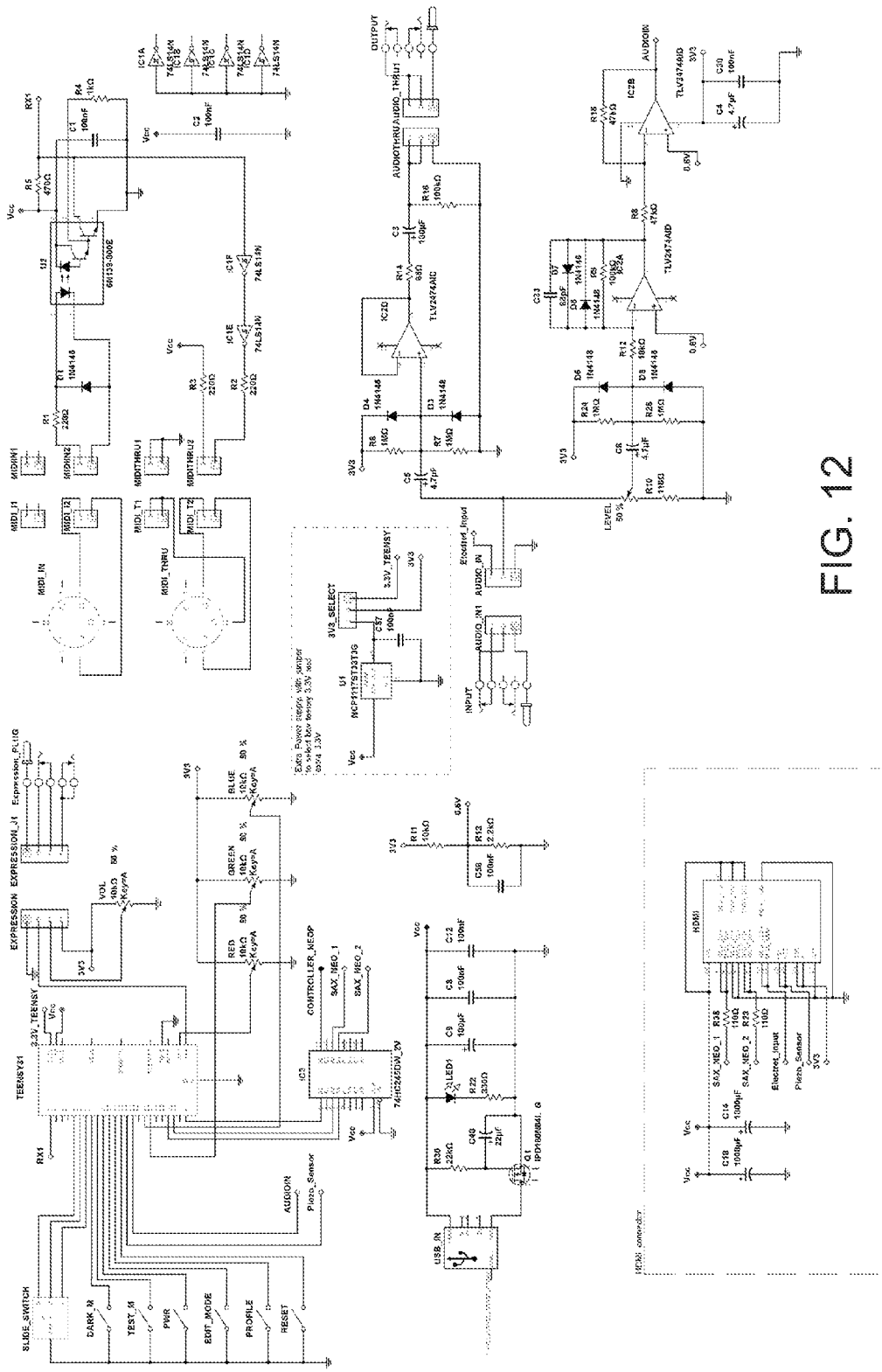
FIG. 12 is an exemplary circuit diagram for the controller.
Figure 13:
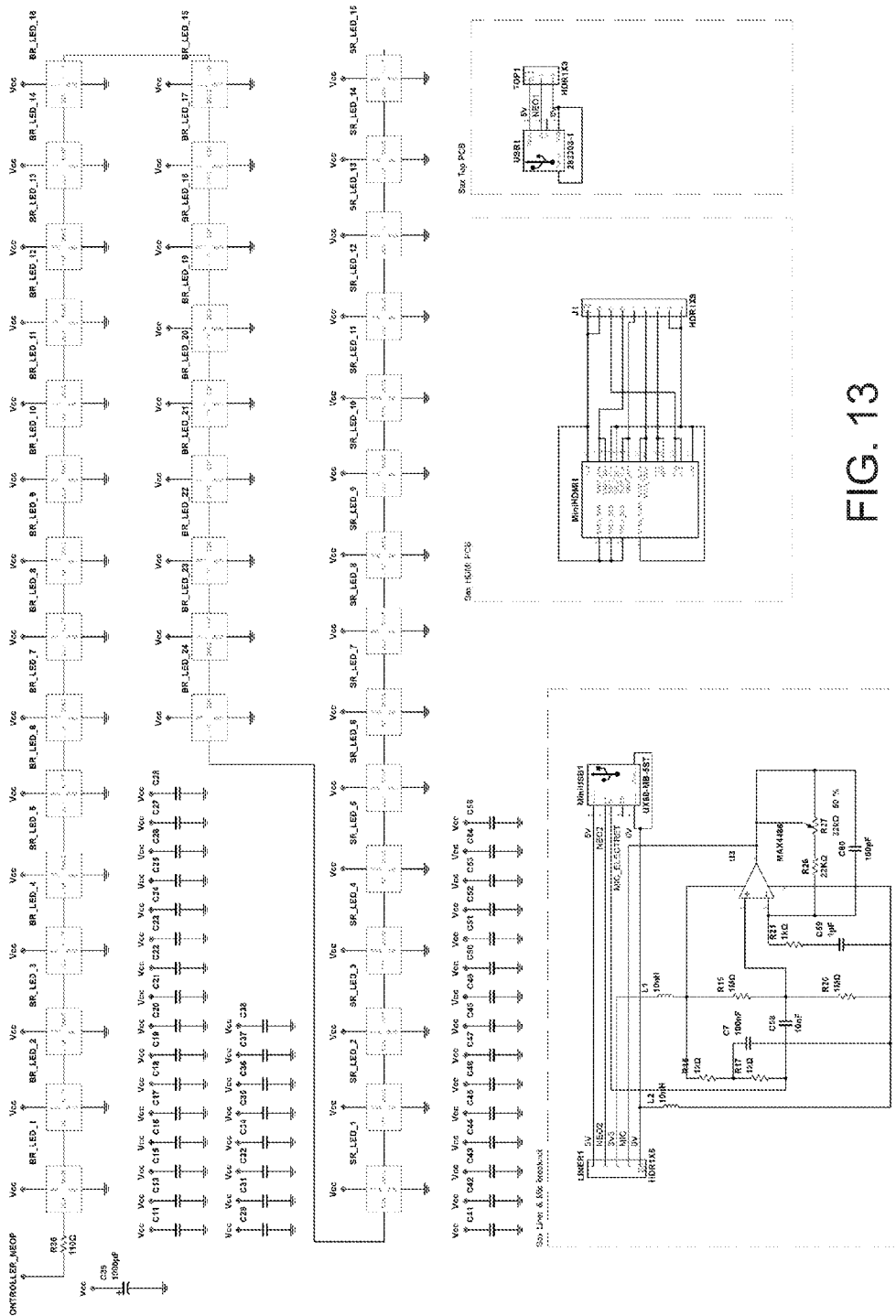
FIG. 13 is an exemplary circuit diagram of an external color adjustable light source, specifically the instrument liner.
Figure 15:
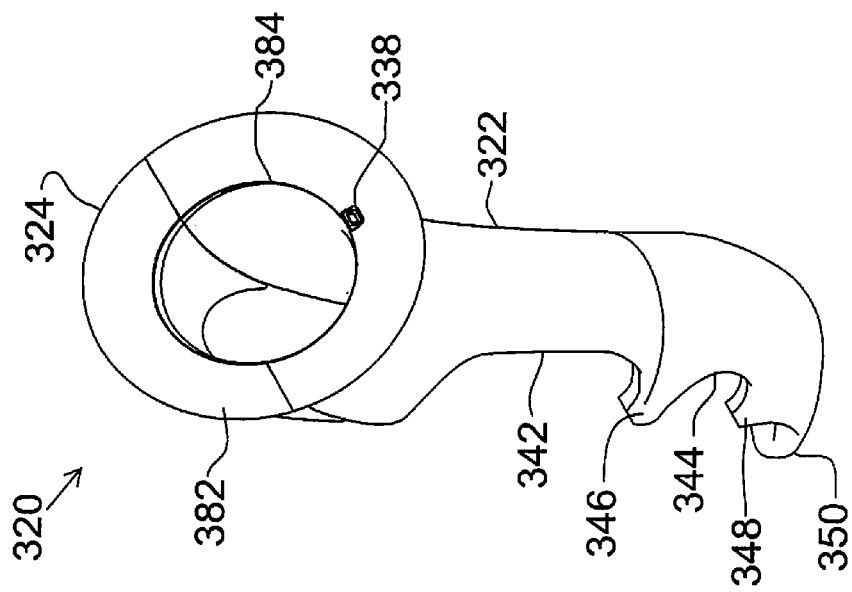
FIG. 15 is a front perspective view of the external color adjustable light source of FIG. 14.

FIGS. 6-8 illustrate the controller (20) embodiment of FIGS. 1-5 with the top shell (24) removed to show the circuit board (80) and the various components mounted thereon, as well as the light divider (72). Further, FIGS. 9-10 illustrate the assembled circuit board (80) separated from the enclosure (22). A light divider (70) is mounted on or is positioned over the circuit board (80), specifically being positioned over the array (82) of LED chips (78). In general, the light divider (70) divides the chips (78) of the LED array (82) into groups of one or more LED chips (78) contained within defined light regions (76). In this way, when the LEDs (78) are viewed through the translucent portion (28), the colors and intensity emitted by each LED group is isolated from a neighboring group, so that bleeding of color and light intensity between defined light regions (76) is minimized to a desired extent. However, strict or complete isolation by division is not required; isolation sufficient to produce useful distinctions between neighboring defined light regions (76) and to provide a pleasing lighting affect is acceptable.

Looking specifically at the light divider (70), dividers or slats (74) divide the LED array (82) into distinct defined light regions (76). The light divider (70) is illustrated as having radially extending slats (74) being integrally molded from plastic with a circumferential slat (72) intersecting the radial slats (74) to provide additional division of defined light regions (76) and to provide additional structural support for the light divider (70). The light divider (70) is illustrated as being radial is design due to the circular design of the underlying LED array (82). However, the light divider (70) have various configurations in which intersecting or otherwise dividing slats (74) partition two or more defined light regions (76), such as a rectangular arrangement or other arrangement as dictated by the positioning of the various LED chips (78) on the circuit board (80). Defined light regions (76) are generally defined between two or more slats (74), but may also be defined by a single slat (74) or other form of divider, such as a wall, a part of a internal component, a portion of the enclosure wall, and so on. In one example (not illustrated), a circular wall or divider can divide an inner set of LED chips from an out set of LED chips. Thus, a single slat or wall creates two defined light regions (76). However, it is preferred to have more defined light regions (76), particularly shaped as wedges, to produce a color wheel effect through the translucent portion (28) of the top shell (24).

FIGS. 9-10 illustrate and example circuit board (80) with the various controls, inputs, and outputs mounted about the circumference. Although the circuit board (80) and controller (20) are described as circular, they can be made in any desired shape according to engineering and aesthetic requirements. In this example, inboard the circuit board (80) is an LED array (82) made of a plurality of LED chips (78) arranged in two concentric circles. This circular array (82) is divided into a multiplicity of defined light regions (76) by the light divider (70). The inner circle of LED chips (78) may be divided from the outer circle of LED chips (78) by the circumferential slat (72), while neighboring LED chips (78) may be divided into sectors by the radial slats (74).

The controller (20) can receive a signal input from one or more of sources through one or more connectors, including an audio phone connector (such as a guitar jack or a microphone) or a midi input (from an electronic keyboard or the like). Further, if an analog signal is received through the phone connector, such as produced by a microphone attached to or near an instrument, the controller (20) preferably converts the analog signal to a digital signal for further processing, as described below. For example, if a musical signal is received from the microphone with a frequency of 261.63 Hz, the analog to digital converter (through a microprocessor) compares the frequency to a known set of frequencies on a lookup table stored in memory to determine the corresponding midi number or midi note, middle C, or C4, or a midi number of 60 in this example.

Figure 31:
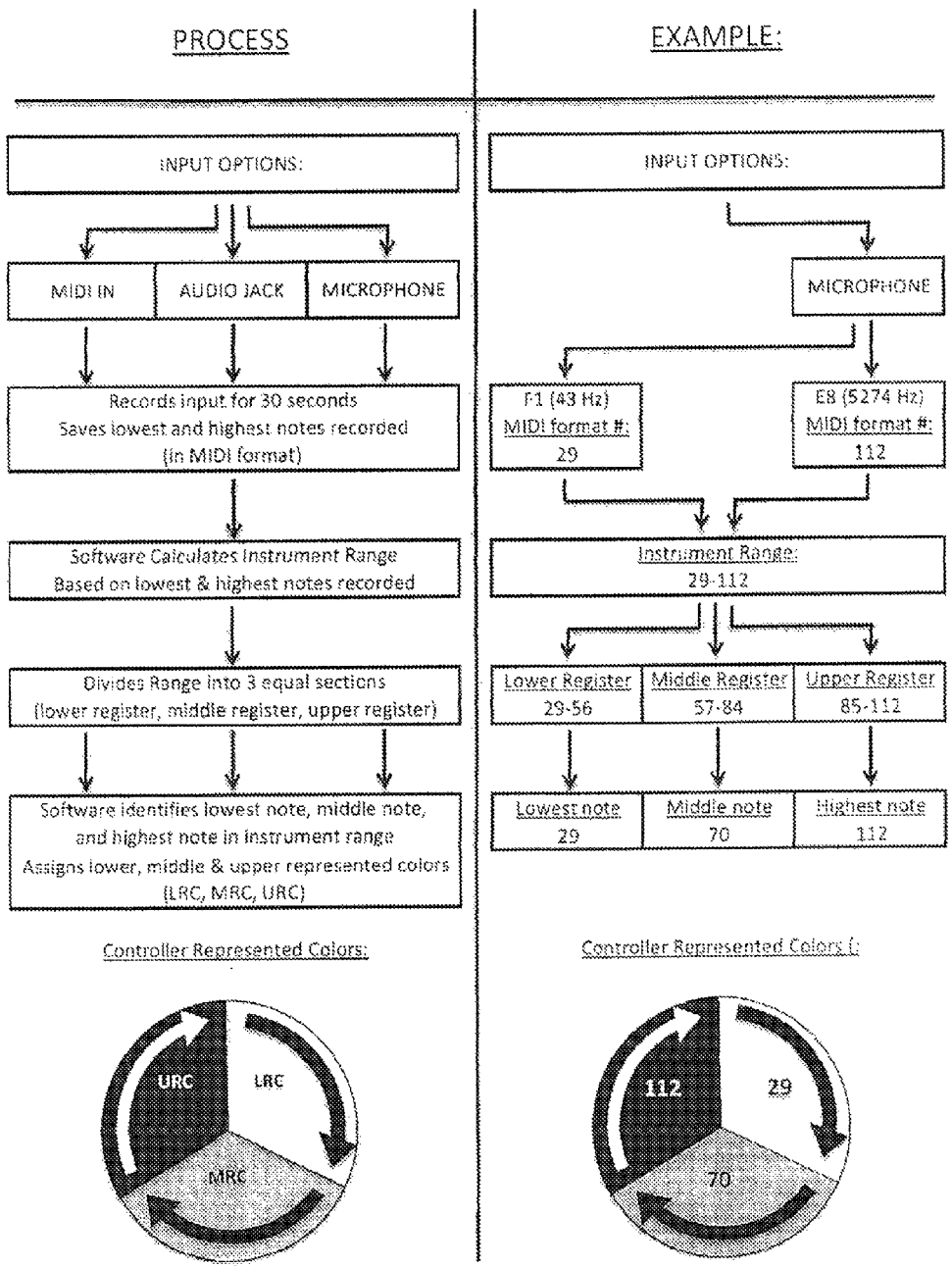
FIG. 31 is a process flowchart of one method of the present invention, illustrating an example method of the instrument setup.

In an example method to use and calibrate or setup the present controller (20) and any external light source as shown in FIG. 31, the user would assign a range of light intensity and a range of colors (frequency on the visible or near-visible spectrum) to correspond to one or both of an instrument volume and a midi number of a musical note being played by the instrument. In one example, the LED intensity (the lumens emitted) is proportional to or related to the volume of the instrument; and the LED color (the RGB decimal value) is proportional to or related to the note being played (the midi number); although the relationship between the light properties and sound properties may be switched.

Before a performance, the user calibrates the controller (20) to set the light intensity range and the color range of the LED array (82) or individual LED chips (78) within the array or separate from the array, such as a separate light source which the controller (20) controls. The calibration is set at the controller (20); and as the user changes the color and intensity parameter, one or more sample lights are illuminated from the individual LED chips (78) in the array (82) to be viewed through the translucent portion (28) of the top shell (24). Thus, as the user adjusts the light properties, one or more LED chips (78) illuminate with the color and intensity set by the user. Preferably, the LED chips (78) within one or more of the defined light regions (76) is illuminated, each showing the same light properties or differing light properties.

The user can choose any range of light colors by adjusting one or more of the red RGB thumbwheel (30), the green RGB thumbwheel (32), and the blue RGB thumbwheel (34) to set a first color value and a second color value, preferably stored within the controller computing and storage (such as a processor connected to an EPROM or the like) in RGB decimal form. In one example, the light divider (70) divides the circular LED array (82) on the controller (20) much like slices of a pie or the wedges of a color wheel. LED chips (78) within a first sector of the light divider (70) emit color representing the first color value; and in the LEDs within the adjacent or last sector of the light divider (70) emit color representing the second color value, establishing a maximum and minimum color value (a sector being the region between two or more slats (74), which may include one or more defined light regions (76)). Another sector of the light divider (70) between the first and last sectors emits a color representing an intermediate color value between the maximum and minimum color values.

Figure 33:
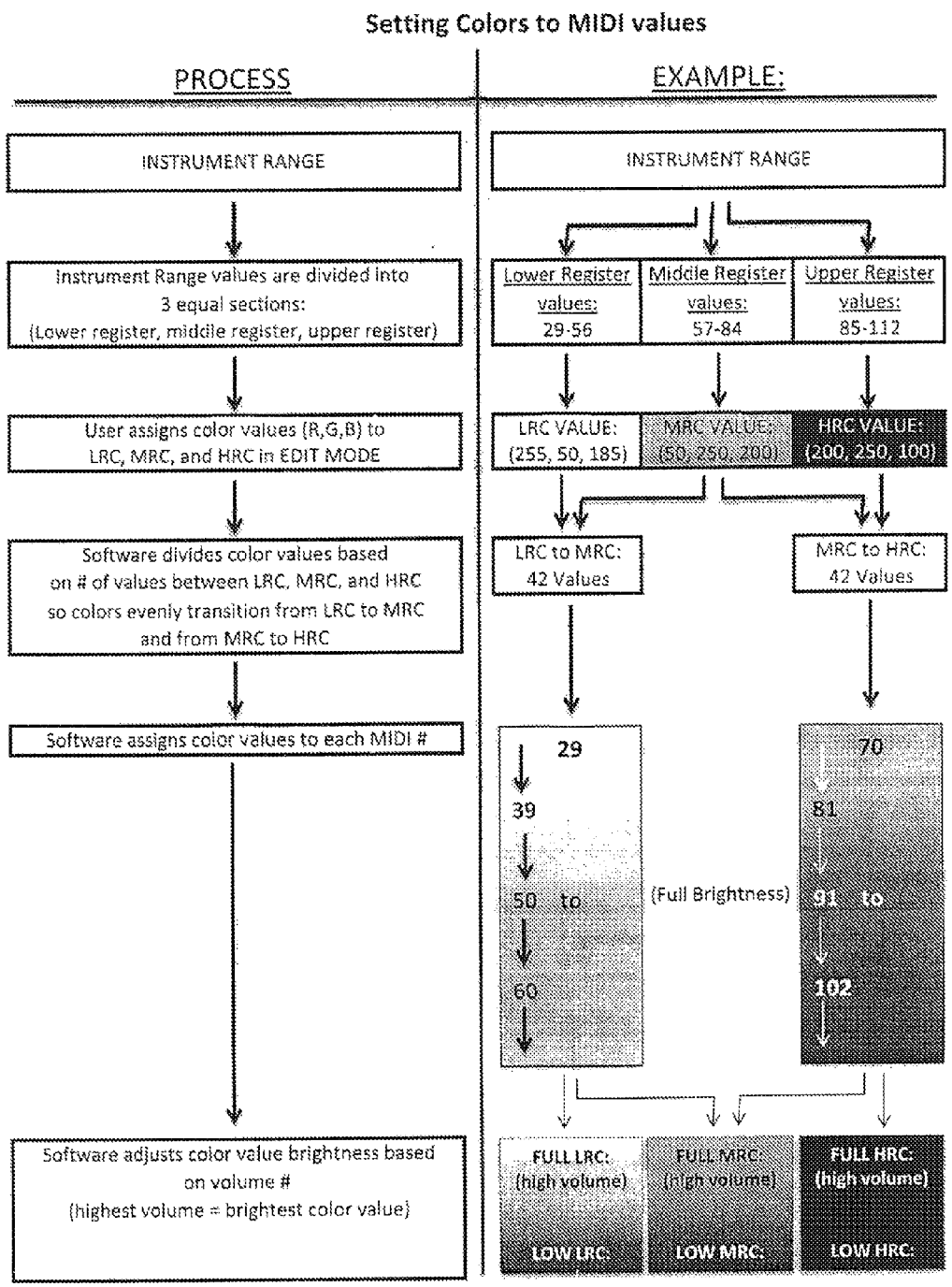
FIG. 33 is a process flowchart of one method of the present invention, illustrating an example method of the light color setup.

As illustrated in FIG. 33, The user adjusts the one or more of the color thumbwheels (30, 32, 34) until a first desired color value is perceived through the translucent portion (28); then that first color value is stored in RGB decimal form, upon the user pressing one or a series of buttons or other selection means. Then, the user adjusts the color thumbwheels (30, 32, 34) a second time until a second desired color value is perceived through the translucent portion (28); then that second color value is stored in RGB decimal form. For example, the first color value may rgb (224, 102, 255) which corresponds to mediumorchid 1; and the second color value may be rgb (135, 206, 235) which corresponds to skyblue. In one example, to determine a third or intermediate color value, the midpoint for each RGB value is calculated. Where the midpoint RGB number for the above example would be approximately rgb (180, 154, 245). Further, a table of all or selected RGB values known to be numerically or on the color chart between the first color and second color may each assigned a particular note on the musical scale or a midi number. A table can be created that correlates an RGB color number with a midi number, where the maximum and minimum midi number or musical note can also be selected by user.

In this way, as the notes played through the instrument vary the midi number, the color emitted by the color adjustable light source also changes proportionally or relationally to the midi number (either the LED array (82) or separate light source). For example, a midi number is the approximate middle range of available midi numbers may correspond to an RGB value approximately in the numerical middle of the maximum and minimum RGB values assigned during the setup. During calibration, the user can visually observe the available range of colors emitted by the LEDs through the translucent portion (28), each color substantially divided from the next by the light divider (70); or the user may only observe the first, second, and third colors. The maximum and minimum values may also be determined by a setup program where the user plays the instrument for 30 seconds. During that time the controller (20) records the minimum and maximum midi numbers or musical notes in the series of notes played and uses these values to set the range.

In a similar manner, looking at FIG. 33, the relationship between the instrument volume and light intensity can be set, so that at a minimum volume value a first light intensity can be set, where the dimming may be achieved through known methods, such as pulse width modulation (pwm), a dimmer, or other similar means to adjust the voltage or amperage. For example, the minimum and maximum voltage values for the LEDs can be set to 1 and 5 volts respectively, which may be set to correspond to a minimum volume of 40 dB and a maximum volume of 60 dB respectively, or other means to measure volume or speaker output. Thus, as the volume emitted by the instrument varies between 40 dB and 60 dB, the voltage proved to the LEDs to adjust the light intensity may proportionally vary between 1V and 5V.

Figure 32C:
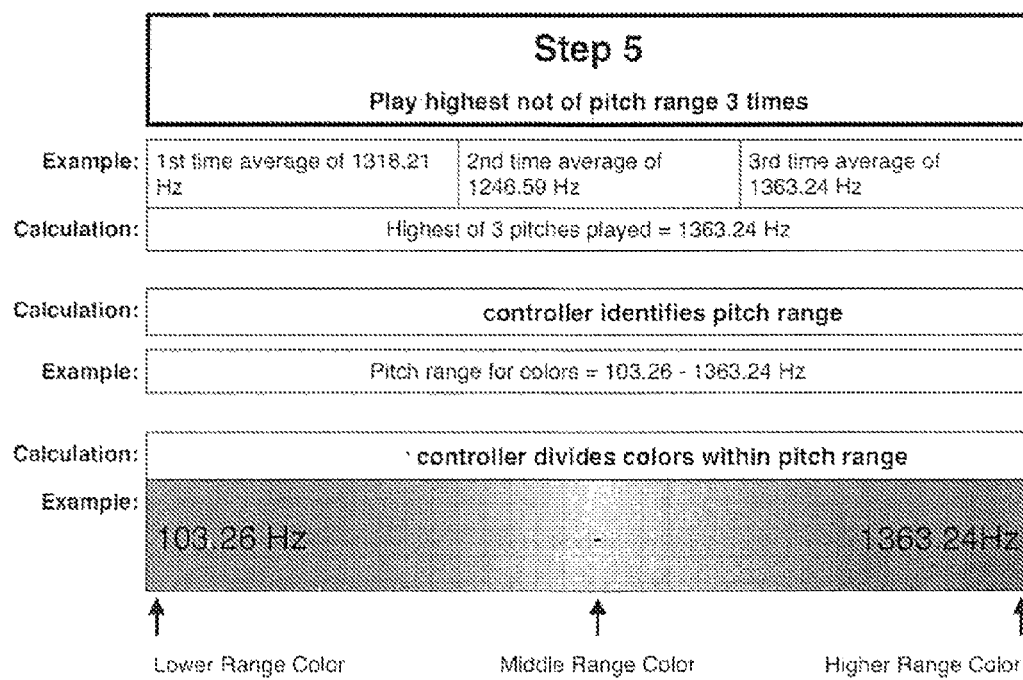

Looking at FIGS. 32A-C, an alternate setup method is illustrated, where the user adjusts the one or more of the color thumbwheels (30, 32, 34) until a first desired color value (or lower range color) is perceived through the translucent portion (28); then that first color value is stored in RGB decimal form, upon the user pressing one or a series of buttons or other selection means. Then, the user adjusts the color thumbwheels (30, 32, 34) a second time until a second desired color value (or middle range color) is perceived through the translucent portion (28); then that second color value is stored in RGB decimal form. Finally, the user adjusts the color thumbwheels (30, 32, 34) a third time until a third desired color value (or high range color) is perceived through the translucent portion (28); then that third color value is stored in RGB decimal form.

After the color value range is entered, the user plays the instrument so that the controller is able to correlate the musical or sound pitch with the color value range. The music may be directly inputted by line or recorded through a microphone. In step 4, the user plays the instrument at the lowest note of the pitch range expected to be played within an associated performance or composition. In step 5, the user plays the instrument at a the highest pitch note of the pitch range expected to be played within the associated performance or composition In this example method, the user plays the lowest and highest notes three times each. Afterwards the controller associates the first color value with the lowest pitch note frequency and the second color value with the highest pitch note frequency. In this way, the user may select the color range and play the instrument to associate the color range with the frequency of the sound emitted from the instrument.

Figure 34:
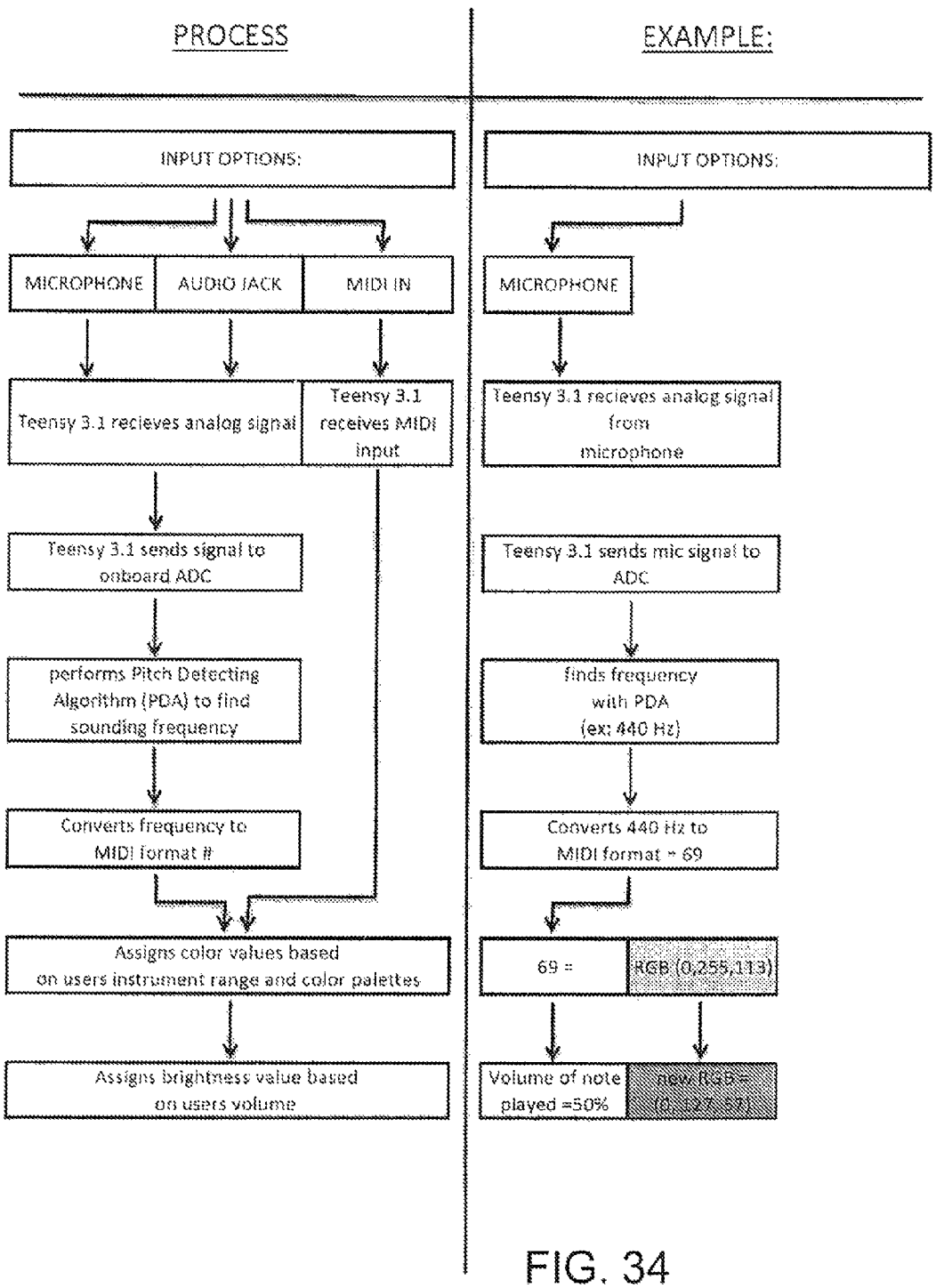
FIG. 34 is a process flowchart of one method of the present invention, illustrating an example method of the instrument setup.

The method of the live mode or performance mode is illustrated in FIG. 34. During the live mode, the controller receives an analog input signal from one of the input sources, converts the analog signal to a MIDI format through the microcontroller (note value & velocity value), and assigns specific color values to each note based on the selected colors of each register and volume the note was played. The microcontroller performs a pitch detecting algorithm to determine the frequency of the sound input, then converts the frequency value to a midi number. And, as described above, each midi number is associated with a color value. Additionally, the intensity value is determined based on volume. The microcontroller activates selected or all LED chips (78), setting them at the associated color value and intensity value for a given note in a performance, these value continually changing as the notes change.

During the setup process, the controller (20) is turned on by pressing the power button (50). The controller (20) automatically launches the instrument setup program, where the controller (20) indicates that it will be recording the sounds for 30 seconds, such as by flashing a sequence of lights or by other display or audio means. As described above, the user then plays particular notes within the 30 second recording period. During this 30 second period, an inner portion of the LED array (82) will simulate a 30 second timer by turning red LEDs on in a clockwise rotation until 30 seconds have passed. Also during this period, the an outer portion of the LED array (82) will simulate an audio signal tuner, indicating to the user that the audio input adjustment thumbwheel (38) needs to adjusted up or down to achieve a strong and clear audio level. Once the 30 second period has expired, the controller (20) will analyze the highest and lowest notes played by the user to set the instrument's musical range. This terminates the instrument setup program and the controller (20) will enter the live mode.

To set up a profile, the controller (20) divides the musical range of the instrument into three sections (or sectors) for each LED set: the lower register corresponds to the lowest note, the middle register corresponds to the middle of the musical range, and the upper register corresponds to the highest note. The user is able to assign a color value to each register so the profile has three possible colors per LED set. Once the colors are selected, the controller divides the color values evenly with the musical range so the selected color of the lower register (lowest note) slowly transitions to the selected color of the middle register (middle note of the musical range) as the user plays up the chromatic scale starting at the lowest note. Once the user reaches the middle register, the selected color of the middle register slowly transitions to the selected color of the upper register as the user continues to play up the chromatic scale and approaches the highest note in the instrument range.

During a musical performance on live mode, the player may wish to turn off the LED array (82) in the controller (20) for a period of time while keeping the controller (20) circuitry activated, by initiating the dark mode. The user presses the dark mode button (46) a first time to turn off the LED array (82), leaving any external light sources on. The dark mode darkens the controller (20) while leaving the external light sources on (such as the illuminated shell). When the dark mode button is pressed again, the LED array (82) is illuminated once again.

The user may also edit profiles during live mode, by entering edit mode. Edit mode is activated by pressing the edit mode button (40), where the user is able to edit the stored profiles—up to ten profiles in the present example embodiment. Repeatedly pressing the edit mode button will toggle through the profiles, with the color values illuminated through the translucent portion (28). The user may press and hold the edit mode button (40) for more than one second to enter edit mode. During this time, the user is able to edit the lower register colors of the LEDs currently selected by using the R,G,B thumbwheels (30, 32, 34). At this time, the user is able to toggle the LED select slide switch (48) back and forth between LED sets to set each LED set color individually or together. Once the desired color is set, the user presses the edit mode button (40) to save the selected colors for the lower register and edit the middle register colors. During this time, the user is able to edit the middle register colors of the LED sets currently selected by using the R,G,B thumbwheels (30, 32, 34). The user is also able to toggle the LED select slide switch (48) back and forth between LED sets to set each LED set color individually or together. Once the desired colors are set, the user presses the edit mode button (40) to save the selected colors for the middle register and edit the upper register colors. During this time, the user is able to edit the upper register colors of the LED sets currently selected by using the R,G,B thumbwheels (30, 32, 34). Also, the user is able to toggle the LED select slide switch (48) back and forth between LED sets to set each LED set color individually or together. Once the desired colors are set, the user presses the edit mode button (40) to save the selected colors for the upper register and edit the brightness sensitivity. Also, the user is able to edit the brightness sensitivity of the LED sets currently selected by using the audio adjustment thumbwheel (38). Also at this time the user is able to toggle the LED select slide switch (48) back and forth between LED sets to set each LED set volume sensitivity individually or together. Once the desired volume sensitivity is set, press the edit mode button (40) to save the selected volume sensitivity for the brightness sensitivity, exit edit and return to live mode.

During the edit mode, the user may enter the test mode by pressing the test mode button (44) to test the actual colors that will be emitted from each LED array or set. The specific LED set that will be viewed is selected by sliding the LED select slide switch (48), for example, the LED array (82) may be selected in a first switch position and an external LED array may be selected in a second switch position. If the LED array (82) is selected, then the color value is displayed at full intensity by activating the LED array (82) with those color values. The user presses the test mode button (44) once again to exit test mode and deactivate the LED array (82).

The various components present in the controller (20) each have specific and sometimes multiple functions. The recessed reset button (54) may be held for a period of time to reset or recalibrate the musical range of the instrument. The power in connector (52) is a micro USB connector enables a connection to a power supply, such as an outlet or battery pack. The audio adjustment thumbwheel (38) may be used to adjust the LED brightness in edit mode or live mode, where if the audio adjustment thumbwheel (38) is turned completely down, the LED array (82) will be turned off. The HDMI connector (64) is used to power and control external LED arrays or other light sources, as well as external microphones. The line in connector (56) is a ¼" mono jack that receives an audio signal from an external pick-up mic supplied by the user, such as a guitar jack, personal microphone, cable, etc. The MIDI in connector (60) receives a midi input from an external MIDI instrument supplied by the user, such as a MIDI keyboard, and electronic wind instrument, a MIDI drum machine, etc.

The line out connector (58) is a ¼" mono jack that transmits the audio signal from the line in connector (56) to another source supplied by the user, such as an effects pedal, an amp, a PA system, a mixing board, a cable, etc. The MIDI through connector (62) transmits the MIDI signal from the MIDI in connector (60) to another source supplied by the user, such as an effects pedal, an amp, a PA system, a mixing board, a cable, etc. The expression pedal connector (66) may be optionally used in place of the intensity thumbwheel (36), so that the user can use a foot pedal for adjusting LED intensity.

FIGS. 14-17 shows an example embodiment of an external light source (an illuminated shell), which includes several views of the assembled illuminated shell (320) ready for attachment to an instrument. The example embodiment described herein illustrates a version of the present illuminated shell (320) for attachment to the bell and bow portions of a saxophone. However, the present illuminated shell (320) can be used with a variety of instruments, such as woodwind, strings, brass, and percussion instruments. Some example instruments could include guitars (electric and acoustic), various horns, pianos, and so on. The shape of at least a portion of the illuminated shell (320) is preferably modified to a shape which is complementary to the instrument, following the instrument's curves and general shape. Although, the illuminated shell (320) may have a shape which varies from the instrument shape in order to make room for various parts of the instrument or to add a decorative effect to the instrument. The present illuminated shell (320) may be attached to the instrument by various attachment means, such as magnets, fasteners, straps, clips, and the like, or the portions of the illuminated shell (320) may grasp the instrument.

Figure 14:
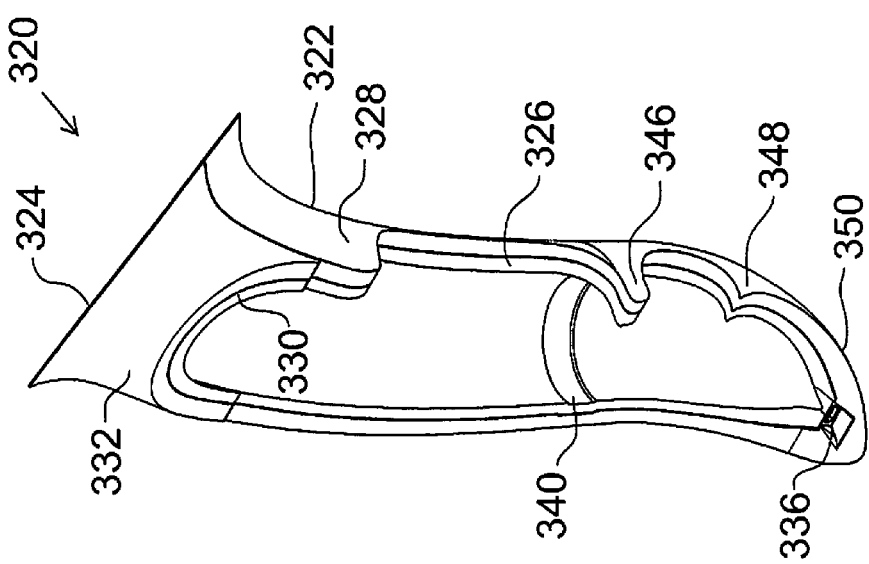
FIG. 14 is a back perspective view of an exemplary external color adjustable light source embodiment, shown assembled and separate from an instrument, an illuminated shell for a saxophone is this example.
Figure 17:
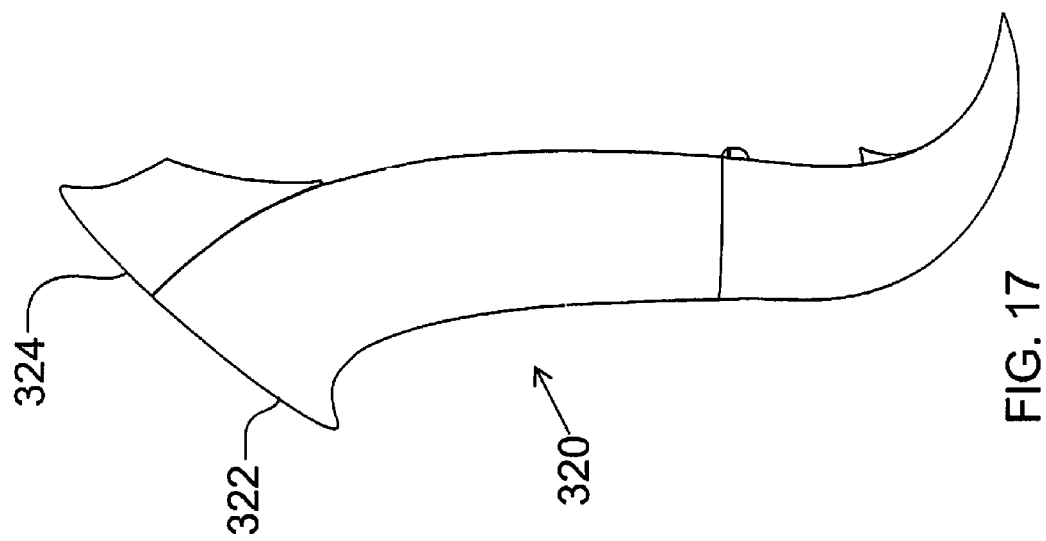
FIG. 17 is a left side view of the external color adjustable light source of FIG. 14.
Figure 16:
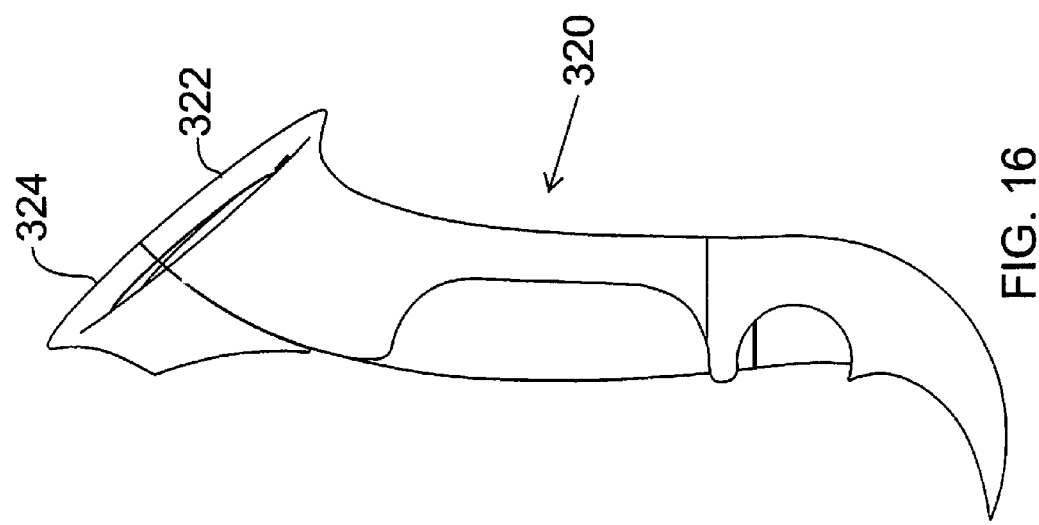
FIG. 16 is a right side view of the external color adjustable light source of FIG. 14.

Looking first at FIG. 14 the assembled illuminated shell (320) has a front shell (322) connected to a back shell (324). In this example illuminated shell (320), for a saxophone, the front shell (322) is split from the back shell (324) to permit the illuminated shell (320) to be attached about the bell and bow portions of the saxophone. The back shell (324) is held to the front shell (322) preferably by rare earth magnets on one or both mating faces of the front shell (322) and the back shell (324). Additionally, various data and power connectors also may aid in holding the front shell (322) and the back shell (324) together, as will be described in further detail below.

The front shell (322) is comprised of a front inner half (326) and a front outer half (328). The front inner half (326) is positioned closest to the instrument wall, and supports a plurality of light emitting diodes (LEDs) and circuitry related to the control and powering of the LEDs. The front outer half (328) is preferably transparent or translucent, and may be either clear, white, or a selected color. A translucent material is preferred to diffuse the light emitted from the LEDs. The back shell (324) is made of a back inner half (330) and a back outer half (332). The back inner half (330) is positioned closest to the instrument wall opposite the front inner half (326), and supports a plurality of light emitting diodes (LEDs) and circuitry related to the control and powering of the LEDs. Like the front outer half (328), the back outer half (332) is preferably translucent.

The front shell (322) is shaped complementarily to fit against and partially wrap about the bell and bow of the saxophone. Gripping arms (346, 348) are permitted to flex outwardly so that the front shell (322) can be attached to the bell and bow, then act to grasp the bell and bow. Key cutouts (342, 344) provide clearance for the musician to access the various keys and controls of the instrument. The front shell (322) additionally has a bow gripping portion (350) which curls under the bow to provide further structure for attaching the front shell (322) to the bow. A semiannular collar groove (340) is formed on the inner surface of the front inner half (326) to provide clearance for the instrument collar and to provide an additional gripping surface.

When the front shell (322) and the back shell (324) are connected, they formed an annularly flared portion (382), which is shaped to closely fit the bell of the saxophone. A first data connector (336) is positioned at the tip of the bow gripping portion (350) to substantially hide the connector (336) from view of the audience. The first data connector (336) acts as the primary data and power connection from the controller (20), and is preferably a HDMI type C connector to send and/or receive one or more data signals and to provide power to the illuminated shell (320). The first data connector (336) provides data and power connection between the controller (20) and the illuminated shell (320). A second data connector (338) is positioned on the front shell (322) at the bell opening (384). An optional second data connector (338) provides a connection via a cable to the third data connector (370) located on the optional bell inner liner (334), which is illustrated n FIGS. 18-22.

As an optional addition to the illuminated shell (320), a bell inner liner (334) may be inserted into the bell of the saxophone; although the bell inner liner (334) is not required. The bell inner liner (334) is generally not generally visible to the audience, yet its light is emitted from the bell. The bell inner liner (334) is made of a molded sheet of flexible material (360), such as plastic, shaped to closely rest against the inner wall of the bell and bow, so that the sound of the instrument is minimally affected. A notch (354) is proved on each side of the bell inner liner (334) to increase flexibility of the molded sheet of flexible material (360) at the notches (354). A plurality of rare earth magnets (362) are located at various points on the bell inner liner (334), which align with mating magnets or ferrous parts on the front inner half (326) of the front shell (322), so that the magnetic force attracts the front inner half (326) to the bell inner liner (334) through the thin brass material of the instrument.

Tricolor or RGB LED strips (364) are attached to the bell inner liner (334); and each of the LEDs are individually digitally addressable to control the color and intensity of the light emitted from each individual LED. On the inner curve of the flared portion (386) of the bell inner liner (334), a directional microphone (366) is mounted near the third data connector (370). The directional microphone (366) is preferably calibrated to receive music emitted from the instrument and substantially exclude external noise. Although the directional microphone (366) is shown attached to the bell inner liner (334), the microphone can be mounted to any portion of the illuminated shell (320) or may be mounted directly to the instrument.

As discussed above, data is transmitted and received through the first data connector (336) through a standard cable (not shown) connected to the controller (20). The second data connector (338) on the front shell (322) connects with the third data connector (370) through a cable bent over the lip of the saxophone bell to provides data and power transmission between the front shell (322) and the bell inner liner (334). Looking at FIGS. 23-26 and 27-30, the fourth data connector pair (376 and 378) serves to connect the front shell (322) to the back shell (324), where, in this example, connector (376) is a female connector and connector (378) is a male connector. The fourth data connector pair (376, 378) transmits data and power between the front shell (322) to the back shell (324).

When the illuminated shell (320) is fully assembled, power and the control signal are transmitted from the controller (20) to the front shell (322) through the first data connector (336). The control signal is for control of one or all of the front shell (322) LEDs, the back shell (324) LEDs, and bell inner liner (334) LEDs. Likewise, the power received through the first data connector powers one or all of the LEDs and electronics of the front shell (322), the back shell (324), and bell inner liner (334). Power and control signals are transmitted from the front shell (322) to either one or both of the back shell (324) and the bell inner liner (334) through the fourth data connector pair (376, 378) and the first data connector (336) and the third data connector (370) pair, respectively. In this way power and the control signal are transmitted to all parts of the illuminated shell (320) through the connectors and connecting circuitry. Further, signals from the microphone (366) are transmitted from the third data connector (370) to the second data connector (338) and to the first data connector (336), and ultimately back to the controller (20) to create a control loop, which is discussed in greater detail below. The size and type of connector can be determined by the maximum amount of power and data expected to be transmitted through the connector, such as HDMI, USB, or mini USB.

The front shell (322) has two parts, the front inner half (326) and the front outer half (328) mechanically connected by glue or other appropriate fastening means. In this illustrated example, the front inner half (326) and the front outer half (328) are connected through a tongue and groove connection about the perimetral edge. Likewise, the back inner half (330) and the back outer half (332) of the back shell (324) are mechanically connected about the perimetral edge by a tongue and groove connection. If desired, this connection may be further maintained by an adhesive coating within the connection, sonic welding, heat welding, or the like.

The present illuminated shell (320) may be attached about the saxophone bell and bow. The front shell (322) mechanically grips the bell and bow, while the back shell (324) is magnetically and/or mechanically connected to the front shell (322). The bell inner liner (334) is slid into the bell from the flared opening, and locates within the bell by magnetically attaching to the magnets or ferrous material on the front shell (320). Thus, the front shell (320) and the bell inner liner (334) pinch the bell and bow between the two under the force of magnetism.

Although the present system and method has been described in considerable detail with reference to certain preferred versions thereof, other versions are possible. Therefore the spirit and scope of the appended claims should not be limited to the description of the preferred versions contained therein.

What is claimed is:

1. A lighting system adjustable in response to a sound, the lighting system comprising:
   a color adjustable light source; and
   a controller comprising a processor core, a memory, a sound signal input, and a light signal output, the sound signal input receptive to a sound frequency signal and a sound amplitude signal, the sound frequency signal being correlated within the controller to a first light property setting, and the sound amplitude signal being correlated within the controller to a second light property setting, the light signal output in communication with the color adjustable light source;
   wherein the sound frequency signal and the sound amplitude signal is determined by measurement of the sound sensed, the first light property setting adjusted in response to change in the sound frequency signal, the second light property setting adjusted in response to change in the sound amplitude signal;
   and wherein the first light property setting and the second light property setting is communicated to the color adjustable light source to adjust a color value and an intensity value of the color adjustable light source.

2. The lighting system of claim 1 wherein the first light property setting is the color value and the second light property setting is the intensity value.

3. The lighting system of claim 1 wherein the first light property setting is the intensity value and the second light property setting is the color value.

4. The lighting system of claim 1 wherein the color adjustable light source is a light emitting diode.

5. The lighting system of claim 1 wherein the color adjustable light source is comprised of a first light source and a second light source arranged on a base.

6. The lighting system of claim 5 further comprising a light divider positioned overtop the base, the light divider comprising a plurality of slats arranged to define a first defined light region and a second defined light region, the first light source aligned to emit light through the first defined light region and the second light source aligned to emit light through the second defined light region.

7. The lighting system of claim 6 wherein a first color value and a first intensity value are communicated to the first light source and a second color value and a second intensity value are communicated to the second light source.

8. The lighting system of claim 7 wherein light emitted by the first light source is substantially restricted to the first defined light region and light emitted by the second light source is substantially restricted to the second defined light region.

9. The lighting system of claim 1 wherein the color adjustable light source is integrated with an enclosure which includes the controller or is a light unit separate from the controller.

10. The lighting system of claim 9 wherein the enclosure includes a translucent region or a transparent region through which light emitted from the color adjustable light source is transmitted out of the enclosure.

11. The lighting system of claim 9 wherein the light unit is attached to an instrument.

12. The lighting system of claim 11 wherein the light unit is shaped to conform to a portion of the instrument.

13. The lighting system of claim 12 wherein one or both of the light unit and the controller includes a microphone to sense sound emitted from the instrument.

14. A controller for adjusting a color adjustable light source in response to a sound, the controller comprising:
   a housing for enclosing circuitry including a processor core, and a memory;
   a sound signal input receptive to a sound frequency signal and a sound amplitude signal, the sound frequency signal being correlated within the controller to a first light property setting, and the sound amplitude signal being correlated within the controller to a second light property setting; and
   a light signal output in communication with the color adjustable light source;
   wherein the sound frequency signal and the sound amplitude signal is determined by measurement of the sound sensed, the first light property setting adjusted in response to change in the sound frequency signal, the second light property setting adjusted in response to change in the sound amplitude signal;
   and wherein the first light property setting and the second light property setting is communicated to the color adjustable light source to adjust a color value and an intensity value of the color adjustable light source.

15. The controller of claim 14 wherein the first light property setting is the color value and the second light property setting is the intensity value.

16. The controller of claim 14 wherein the first light property setting is the intensity value and the second light property setting is the color value.

17. A lighting system that is adjustable in response to a sound, the lighting system comprising:
   a color adjustable light source comprising a first light source and a second light source arranged on a base;
   a controller comprising a processor core, a memory, a sound signal input, and a light signal output, the sound signal input receptive to a sound frequency signal and a sound amplitude signal, the sound frequency signal being correlated within the controller to a first light property setting, and the sound amplitude signal being correlated within the controller to a second light property setting, the light signal output in communication with the color adjustable light source; and
   a light divider positioned overtop the base, the light divider comprising a plurality of slats arranged to define a first defined light region and a second defined light region, the first light source aligned to emit light through the first defined light region and the second light source aligned to emit light through the second defined light region; and
   a housing for enclosing the color adjustable light source and the controller, the housing including a translucent region or a transparent region through which light emitted from the color adjustable light source is transmitted out of the enclosure;
   wherein the sound frequency signal and the sound amplitude signal is determined by measurement of the sound sensed, the first light property setting adjusted in response to change in the sound frequency signal, the second light property setting adjusted in response to change in the sound amplitude signal;

and wherein the first light property setting and the second light property setting is communicated to the color adjustable light source to adjust a color value and an intensity value of the color adjustable light source.

18. The lighting system of claim 17 wherein the first light property setting is the color value and the second light property setting is the intensity value.

19. The lighting system of claim 17 wherein the first light property setting is the intensity value and the second light property setting is the color value.

20. The lighting system of claim 17 wherein a first color value and a first intensity value are communicated to the first light source and a second color value and a second intensity value are communicated to the second light source.

* * * * *